(12) United States Patent
Petter et al.

(10) Patent No.: US 8,506,720 B2
(45) Date of Patent: Aug. 13, 2013

(54) WASH RACK SYSTEM WITH SIDE TROUGH

(75) Inventors: Matthew J. Petter, Douglas, MI (US);
Douglas A. Petter, South Haven, MI (US)

(73) Assignee: Petter Investments, Inc., South Haven, MI (US)

( * ) Notice: Subject to any disclaimer, the term of this patent is extended or adjusted under 35 U.S.C. 154(b) by 336 days.

(21) Appl. No.: 11/761,454

(22) Filed: Jun. 12, 2007

(65) Prior Publication Data
US 2008/0308124 A1    Dec. 18, 2008

(51) Int. Cl.
*B08B 3/04*    (2006.01)
*B08B 3/14*    (2006.01)
*B08B 13/00*    (2006.01)

(52) U.S. Cl.
USPC .............. 134/10; 134/123; 134/135; 134/186

(58) Field of Classification Search
USPC ................................. 134/10, 104.2, 109, 123
See application file for complete search history.

(56) References Cited

U.S. PATENT DOCUMENTS

| | | |
|---|---|---|
| 124,061 A | 2/1872 | Hodgman |
| 582,395 A | 5/1897 | McDougall |
| 1,146,845 A | 7/1915 | Burham |
| 1,467,994 A | 9/1923 | Bohland |
| 1,863,914 A | 6/1932 | Tyler |
| 1,899,657 A | 2/1933 | Zadermach |
| 2,013,742 A | 9/1935 | Butler |
| 2,352,356 A | 6/1944 | Albertson |
| 2,788,954 A | 4/1957 | Paasche |
| 2,990,167 A * | 6/1961 | Russell ........................... 299/64 |
| 3,101,148 A | 8/1963 | Brown |
| 3,175,564 A | 3/1965 | Baird, Jr. et al. |
| 3,259,138 A | 7/1966 | Heinicke |
| 3,784,044 A | 1/1974 | Bruggeman et al. |
| 3,803,777 A | 4/1974 | Stewart |
| 3,970,556 A | 7/1976 | Gore |
| 3,971,394 A | 7/1976 | Osborne |
| 3,996,136 A | 12/1976 | Jakubek et al. |
| 4,135,533 A | 1/1979 | Gall et al. |
| 4,246,982 A | 1/1981 | Pretnick |
| 4,543,182 A | 9/1985 | Gramse |
| 4,637,413 A | 1/1987 | Llewellyn et al. |
| 4,652,368 A | 3/1987 | Ennis et al. |

(Continued)

FOREIGN PATENT DOCUMENTS

| | | |
|---|---|---|
| JP | 58188740 A | 11/1983 |
| JP | 03090455 A | 4/1991 |

(Continued)

OTHER PUBLICATIONS

Internet web pages: http://www.pressureisland.com/6.times.6.htm and http://www.pressureisland.com/6.times.12.htm (Sep. 4, 1998).

(Continued)

*Primary Examiner* — Michael Kornakov
*Assistant Examiner* — Natasha Campbell
(74) *Attorney, Agent, or Firm* — Honigman Miller Schwartz and Cohn LLP

(57) ABSTRACT

A cleaning system is provided which includes a wash floor, a side trough adjacent the wash floor, which is positioned to receive waste from the wash floor and is attached to a filtering system. A method of using this cleaning system is also provided.

18 Claims, 7 Drawing Sheets

(56) References Cited

U.S. PATENT DOCUMENTS

| | | |
|---|---|---|
| 4,765,670 A | 8/1988 | Jackson |
| 4,808,237 A | 2/1989 | McCormick et al. |
| 4,818,388 A | 4/1989 | Morioka et al. |
| 4,930,632 A | 6/1990 | Eckert et al. |
| 4,979,536 A | 12/1990 | Midkiff |
| 5,033,489 A | 7/1991 | Ferre et al. |
| 5,036,976 A | 8/1991 | Sechler et al. |
| 5,150,727 A | 9/1992 | D'Amato |
| 5,167,837 A | 12/1992 | Snodgrass et al. |
| 5,186,758 A | 2/1993 | Hartmann |
| 5,199,457 A | 4/1993 | Miller |
| 5,207,922 A | 5/1993 | McFarlan et al. |
| 5,253,777 A | 10/1993 | Schutz |
| 5,261,433 A | 11/1993 | Smith |
| 5,265,630 A | 11/1993 | Hartmann |
| 5,300,341 A | 4/1994 | Gross |
| 5,330,579 A | 7/1994 | Rushing et al. |
| 5,374,352 A | 12/1994 | Pattee |
| 5,383,483 A | 1/1995 | Shibano |
| 5,423,339 A | 6/1995 | Latimer |
| 5,458,299 A | 10/1995 | Collins et al. |
| 5,462,655 A | 10/1995 | Ladd et al. |
| 5,498,329 A | 3/1996 | Lamminen et al. |
| 5,535,766 A | 7/1996 | Edwards |
| 5,547,312 A | 8/1996 | Schmitz, Jr. |
| 5,556,535 A | 9/1996 | Van Der Est |
| 5,560,782 A | 10/1996 | Latimer |
| 5,590,671 A | 1/1997 | Yachera |
| 5,595,308 A | 1/1997 | King et al. |
| 5,597,001 A | 1/1997 | Rasmussen et al. |
| 5,647,977 A | 7/1997 | Arnaud |
| 5,669,982 A | 9/1997 | Latimer |
| 5,673,715 A | 10/1997 | Carter |
| 5,730,164 A | 3/1998 | Midkiff et al. |
| 5,732,646 A | 3/1998 | Brandt |
| 5,738,139 A | 4/1998 | DeChard |
| 5,785,067 A | 7/1998 | Kosofsky |
| 5,797,994 A | 8/1998 | Rasmussen |
| 5,803,982 A | 9/1998 | Kosofsky et al. |
| 5,839,852 A | 11/1998 | Mattson |
| 5,848,856 A | 12/1998 | Bohnhoff |
| 6,000,631 A | 12/1999 | Lamminen et al. |
| 6,021,792 A | 2/2000 | Petter et al. |
| 6,082,382 A | 7/2000 | Buksa et al. |
| 6,106,712 A | 8/2000 | New |
| 6,120,614 A | 9/2000 | Damron et al. |
| 6,132,509 A | 10/2000 | Kuschnereit |
| 6,148,298 A | 11/2000 | LaStrange et al. |
| 6,279,271 B1 | 8/2001 | Burkart, Jr. |
| 6,301,848 B1 | 10/2001 | Whitaker |
| 6,358,330 B1 | 3/2002 | McGraw |
| 6,561,201 B1 | 5/2003 | Midkiff |
| 6,640,374 B1 * | 11/2003 | Courtney et al. ............. 15/78 |
| 6,655,396 B2 | 12/2003 | Krenzel |
| 6,799,591 B2 | 10/2004 | McCormick et al. |
| 6,895,978 B2 * | 5/2005 | Midkiff .............. 134/104.1 |
| 7,258,749 B2 | 8/2007 | McCormick et al. |
| 2002/0117191 A1 | 8/2002 | Krenzel |
| 2002/0121293 A1 * | 9/2002 | McCormick et al. ........ 134/42 |
| 2003/0205257 A1 | 11/2003 | Gross |
| 2004/0231703 A1 * | 11/2004 | McCormick et al. ........ 134/10 |
| 2006/0260658 A1 * | 11/2006 | Niedzwiecki et al. ...... 134/105 |

FOREIGN PATENT DOCUMENTS

| | | |
|---|---|---|
| JP | 04038252 A | 2/1992 |
| JP | 07052761 A | 2/1995 |
| JP | 07172271 A | 7/1995 |
| JP | 08034321 A | 2/1996 |
| JP | 08175342 A | 7/1996 |
| JP | 10277311 A | 10/1998 |
| WO | WO9701399 | 1/1997 |

OTHER PUBLICATIONS

Pressure Island Brochure (Oct. 1996).

Environmental Products, Inc., Rinsate Pad.RTM brochure, distributed prior to Sep. 1997.

EZ Environmental Solutions Co., Pressure Island(TM) Brochure, distributed prior to Sep. 1997.

Hydroblaster's brochure by Hydro Engineering, Inc. (May 1998).

Internet web pages http://www.hydroblaster.com/filter/hydropad.htm (Sep. 1998).

* cited by examiner

WASH RACK SYSTEM WITH SIDE TROUGH

BACKGROUND OF THE INVENTION

The present invention relates to a cleaning system or cleaning facility for parts or machinery, and specifically it relates to a cleaning system that has one area for cleaning and another area for removal of waste.

SUMMARY OF THE INVENTION

Once aspect of the present invention is a cleaning system having a wash floor comprising a deck, with the wash floor being adapted to allow waste to escape the wash rack. A side trough is adjacent the wash floor, and the side trough is positioned to receive waste from the wash floor. A filtering system is attached to the trough, which comprises a pump for pumping liquid from the trough to the filtering system.

Another aspect of the present invention is a cleaning system having a wash floor, a side trough adjacent the wash floor, where the side trough comprises a drainage fitting, and a filtering system comprising a tube and a pump, the tube being attached to the pump and to the drainage fitting.

Yet another aspect of the present invention is a method of cleaning an object comprising the steps of: (a) providing a cleaning system having a wash floor adapted to allow waste to escape the wash rack; a side trough adjacent the wash floor, which is positioned to receive waste from the wash floor, and a filtering system attached to the trough which comprises a pump for pumping liquid from the trough to the filtering system; (b) placing an object on the wash floor; (c) cleaning the object; (d) pumping liquid from the side trough to the filtering system; and (e) removing remaining matter from the side trough.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 3:
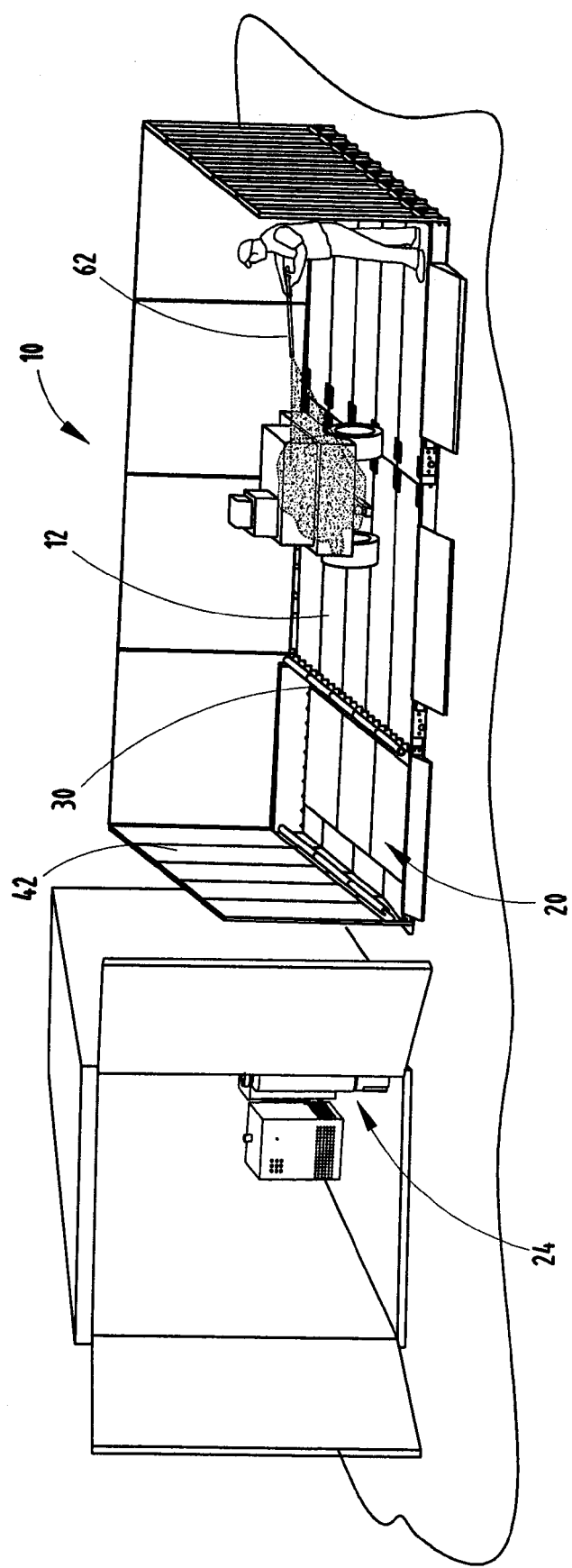
FIG. 3 is an elevational view of a cleaning system in use, which embodies the present invention.

For purposes of description herein, the terms "upper," "lower," "right," "left," "rear," "front," "vertical," "horizontal," and derivatives thereof shall relate to the invention as generally oriented in FIG. 3. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
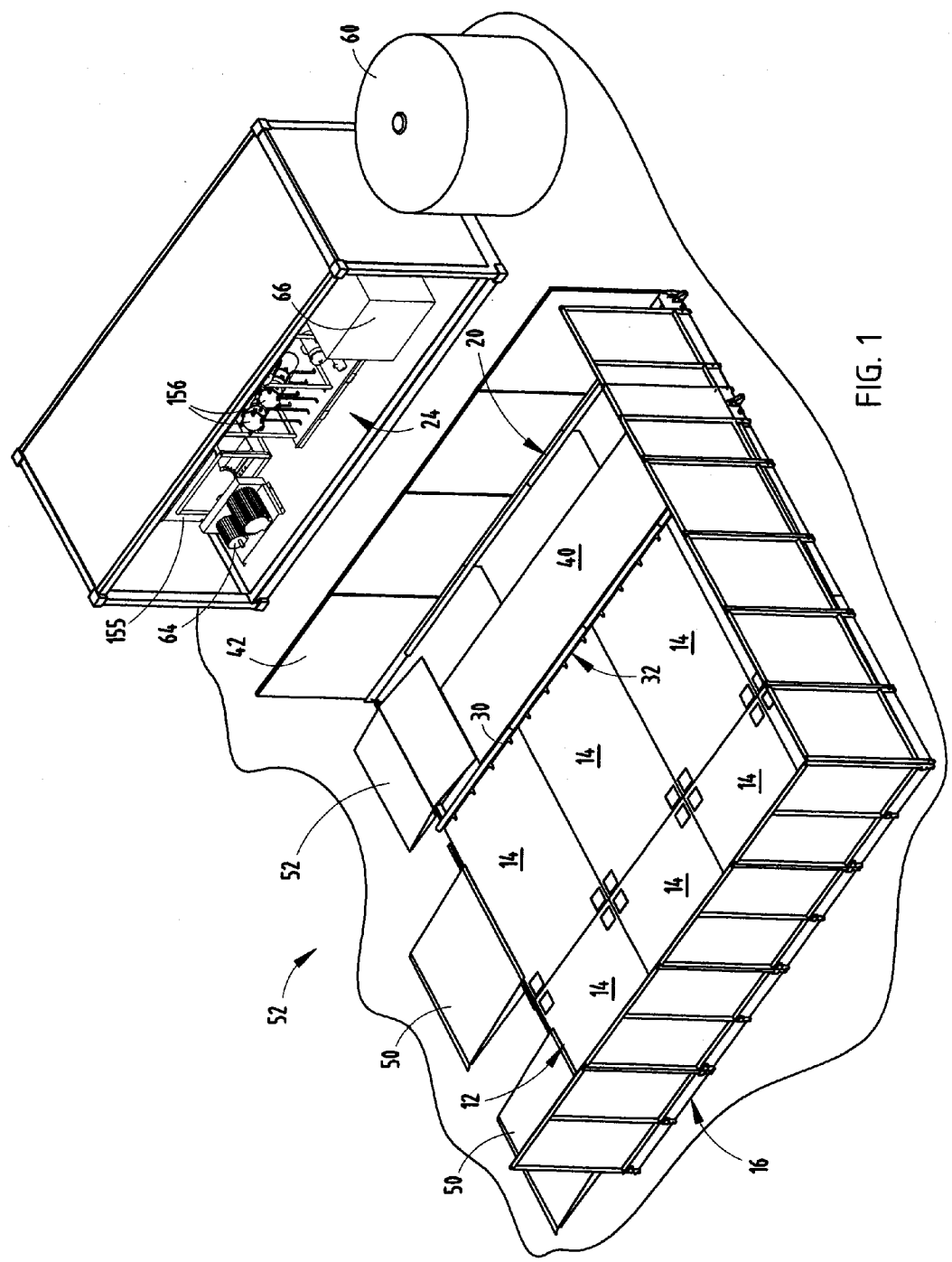
FIG. 1 is a rear perspective view of a cleaning system embodying the present invention.
Figure 2:
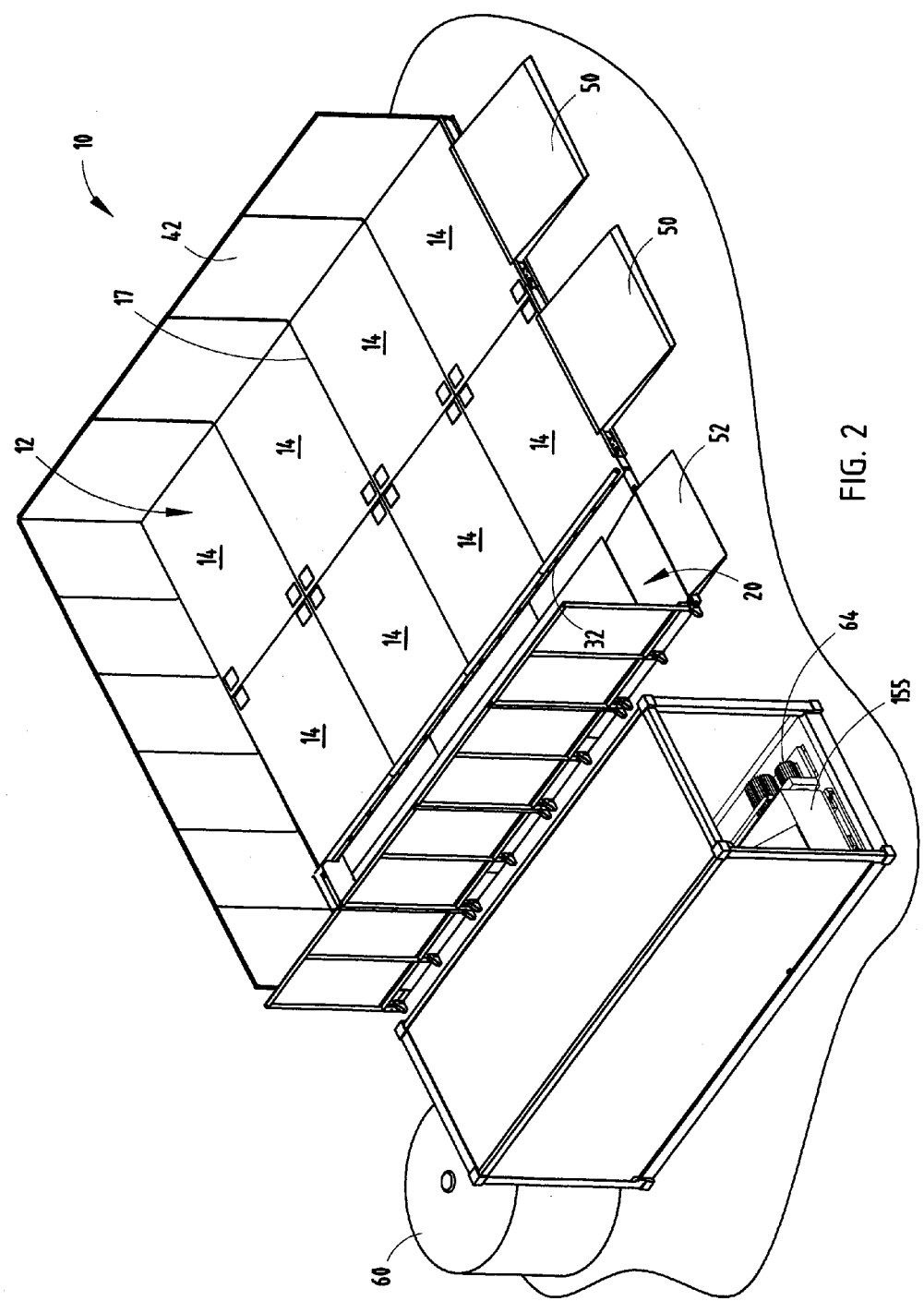
FIG. 2 is a front perspective view of a cleaning system embodying the present invention.

The preferred embodiment of the present invention is a cleaning system 10 which generally includes a wash floor 12, a frame 16, a side trough 20, and a filtering system 24 (see FIGS. 1-2). The wash floor 12 is preferably comprised of multiple, modular wash racks 14. A frame 16 is attached to the wash racks 14 to support the wash floor 12 and optionally a wall 42. The wash floor 12 is preferably comprised of modular solid wash racks to allow variation, and thus flexibility, in the size of the overall cleaning system. Thus, the cleaning system 10 can be sized according to desire and need for the end user. Each wash rack of the floor 12 should be sturdy enough to at least hold 10,000 lbs. Thus, for a typical application with six or more wash racks, the wash floor 12 can hold a 60,000-lb. piece of equipment, for example, without permanently deforming. The modular wash racks 10 are connected to one another to create the wash floor 12. The modular wash racks may be attached to each other by many different means, but a preferred means is using nuts and bolts through orifices in the respective wash rack walls. The wash floor 12, thus, is preferably a single, solid surface, which is tilted downward slightly toward the side trough 20, as will be explained in more detail below.

Side trough 20 is immediately adjacent wash floor 12. The side trough may be on any side of the wash floor 12, and it is contemplated that multiple side troughs could be used with the present invention. Side trough 20 is preferably made of one or more flat metal sheets 40 to create a trough deck which is lower vertically than the lowest point of wash floor 12. Side trough 20 is also preferably sized to allow a skid-steer loader to fit therein, at least partially, to allow removal of waste.

Wall 42 defines at least one side of side trough 20 and may extend around as much as three sides of the entire cleaning system, as shown in FIGS. 1-2. Preferably attached to the wash floor are one or more ramps 50 allow easy access to the wash floor 12 by different vehicles. A ramp 52 is also preferably used with the side trough 20 to allow easy access by a skid-steer loader or other vehicle to the side trough, while helping prevent escape of waste from the side trough.

A rail 30 is attached to the wash floor. Rail 30 is attached at side edge of the wash rack near the side trough 20. Rail 30 helps guide a skid-steer loader in side trough 20. Rail 30 includes multiple openings 32, which allow both liquid and solids to move there through. Thus, given the slight downward tilt of wash floor 12 toward the side trough 20, and the lower deck of side trough 20 relative to wash floor 12, the waste from the washed object may flow through the openings 32 in the rail 30 down into the side trough 20.

Figure 7:
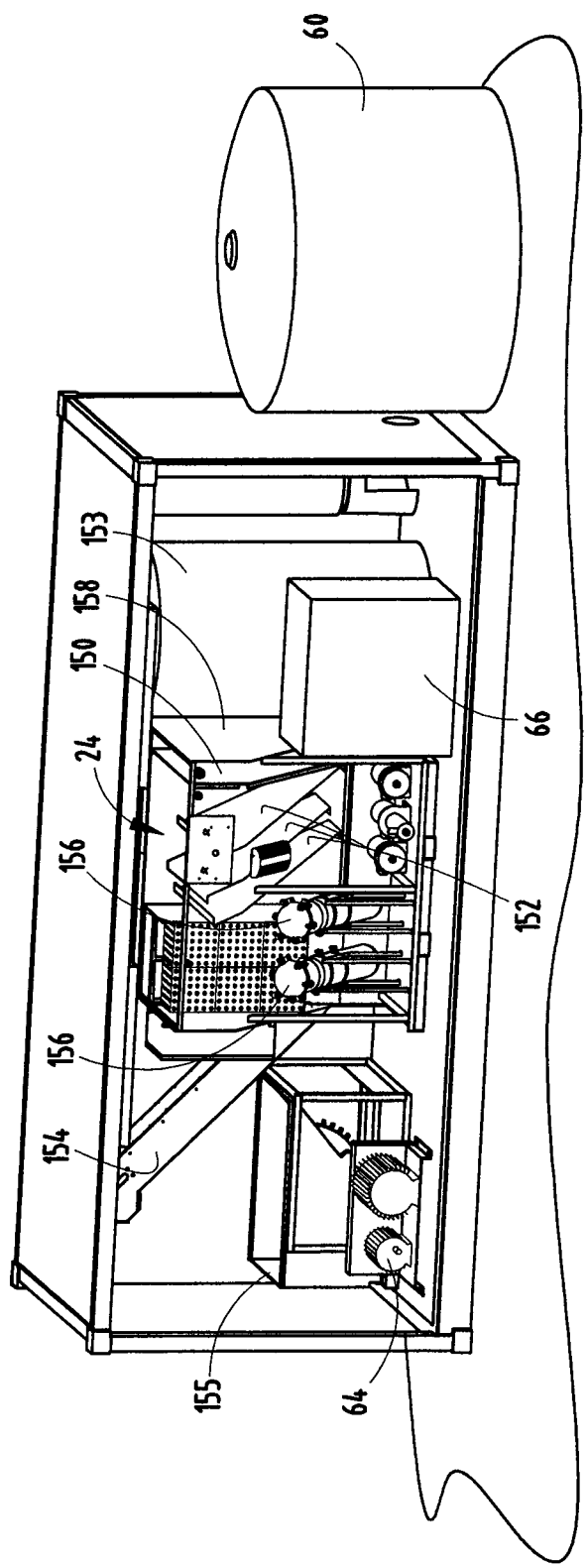
FIG. 7 is an elevational view of a filtering system that can be used with the present invention.

The filtering system 24 of the present invention may be any filtering system that is capable of filtering wastewater and recycling that wastewater to be used in the cleaning process of an object. For most situations, however, the following filtration system is preferred. The filtering system is a three-stage, primary filtration system with 1,600 gallon total settling capacity (see FIG. 7). The first stage is a 1,200-gallon inlet settling tank 150 with a velocity-reducing inlet pipe for creating laminar flow. The tank includes ten sections with an undercurrent design using stainless steel weir structures and 45° walls 152 to direct solids to an automatic removal system. The second stage is a 200-gallon coalescing tank 153 that includes 6 cubic feet of coalescing media with over 600 square feet of surface area. The coalescing media is highly efficient, polypropylene media, with 100 percent passthrough design, and this stage includes an oil skimmer with an external reservoir. The third stage is a 200-gallon filtration staging tank with an underflow design to maintain proper pump prime-and-flow velocity. Filtering system 24 also includes an integrated mud removal system with a 6-inch conveyor 154 that is automatic. The conveyor 154 moves waste and debris to a hopper 155 for later removal. The conveyor includes a ½-horse power, 1100 rpm, TEFC drive motor and a self-dumping hopper with sludge dryer drain, a wheeled-chassis, and 7-gauge construction. The filtering system also includes two RP bag filters 156.

The majority of filtering system 24 is in a 304 stainless steel, 10-gauge housing 158 construction throughout. It also includes a durable skid base for easy transport and installation. The filtration pumping system includes a stainless steel HD float switch and a 1-inch outlet with stainless steel perforations to prevent ingestion of foreign matter into the pump. The media filtration component is a 750-pound vertical, 120-PSI media housing for suspended solids removal, with three-level media loading. This component also includes a stainless steel backwash tank and a reusable stainless steel debris screen. The final filter housing includes filters down to 5 micron and a Certa-Seal® filter bag. The filter system 24 also optionally includes ozone injection generated electrically, and including a DEL® ozone generator with dual element corona discharge elements and indicator lights. A filter system such as the one described in U.S. Pat. No. 6,021,792, may also be employed.

Figure 4A:
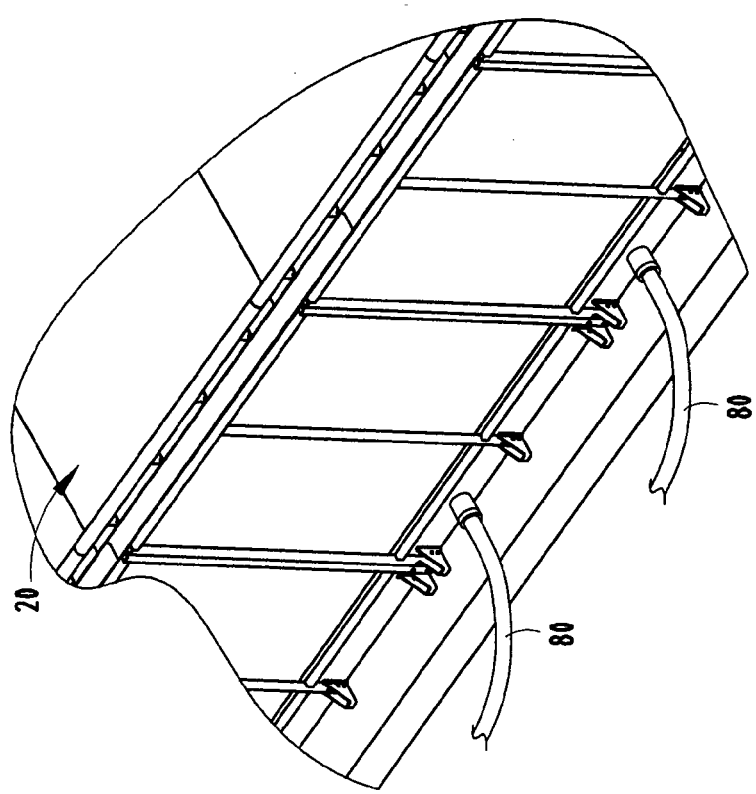
FIGS. 4 and 4A are partial views of the side trough showing the drainage fittings.
Figure 4:
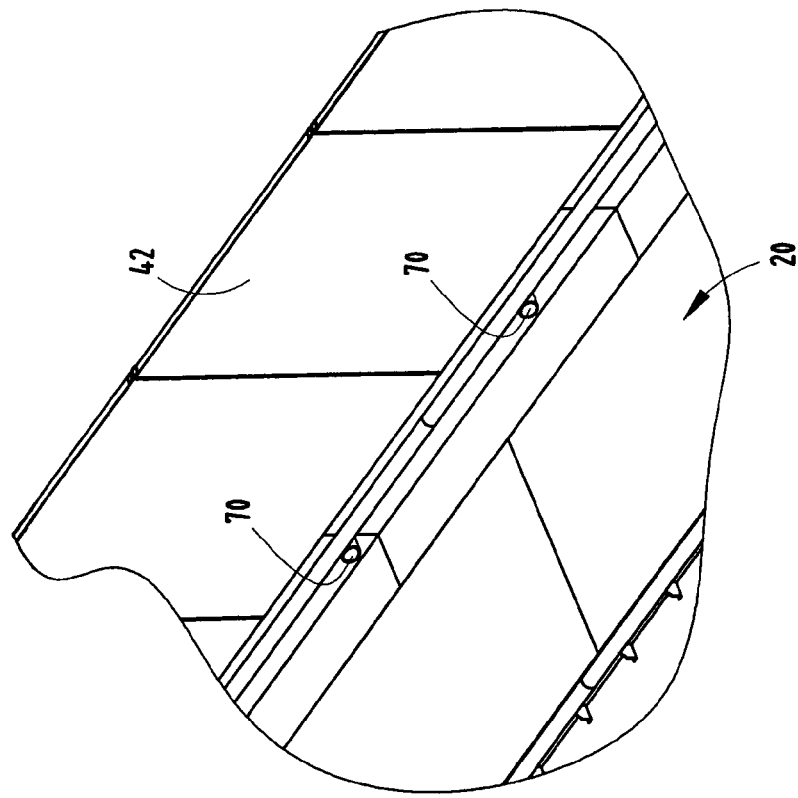

Side trough 20 preferably includes one or more drainage fittings 70 (see FIGS. 4 and 4A). Drainage fittings 70 are preferably sized small enough so that large solid semi-solid waste will not flow through them and are located in side trough 20 so liquid can be conveniently removed from side trough 20. Preferably, three drainage fittings 70 are located in side trough 20, but not all need to be used at any given time. Drainage fittings 70 are adapted to be able to connect to a tube 80 attached to the filtering system.

In operation, an object is driven or placed on wash floor 12. The object may be of any size, depending on the size and shape of the wash floor. A water tank 60 contains fresh, clean water. This water is used to clean the object through discharge from a nozzle 62 (see FIG. 3). The nozzle is attached to one or more power washers, preferably two. The first pressure washer 64 is a high-volume, low-pressure washer, and the second pressure washer 66 creates a high-pressure spray, both of which are used to clean the object on wash floor 12. Because wash floor 12 is at an angle with respect to the horizontal plane, downward toward the side trough 20, the water and waste have a tendency to flow toward side trough 20, through the openings 32 in rail 30, and down into side trough 20 due to gravity. After the object is cleaned, the nozzle 62 or other means can be used to move the remaining waste from wash floor 12 to side trough 20.

Figure 5:
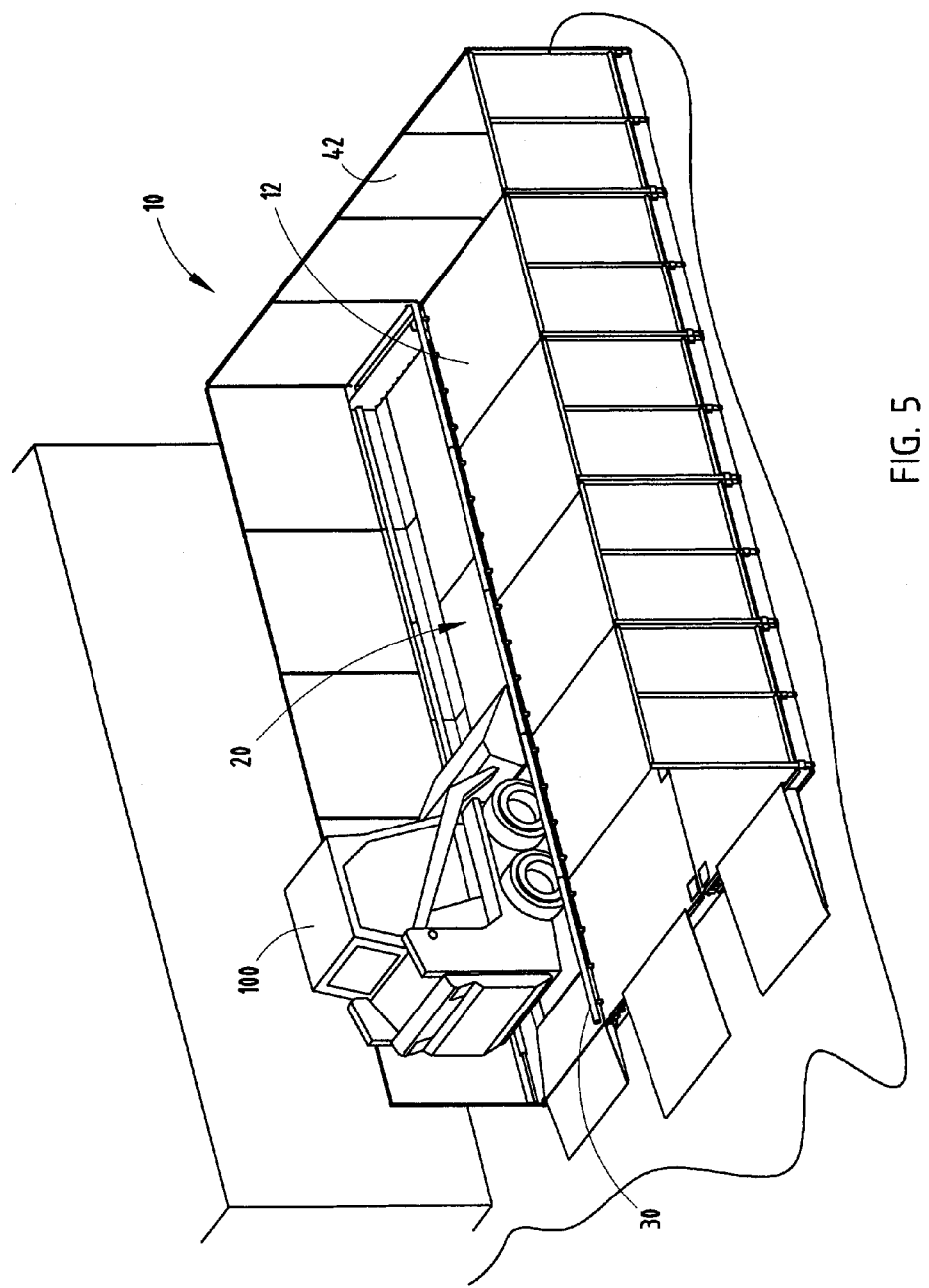
FIG. 5 is a perspective view of a cleaning system embodying the present invention with the side trough being cleaned out.
Figure 6:
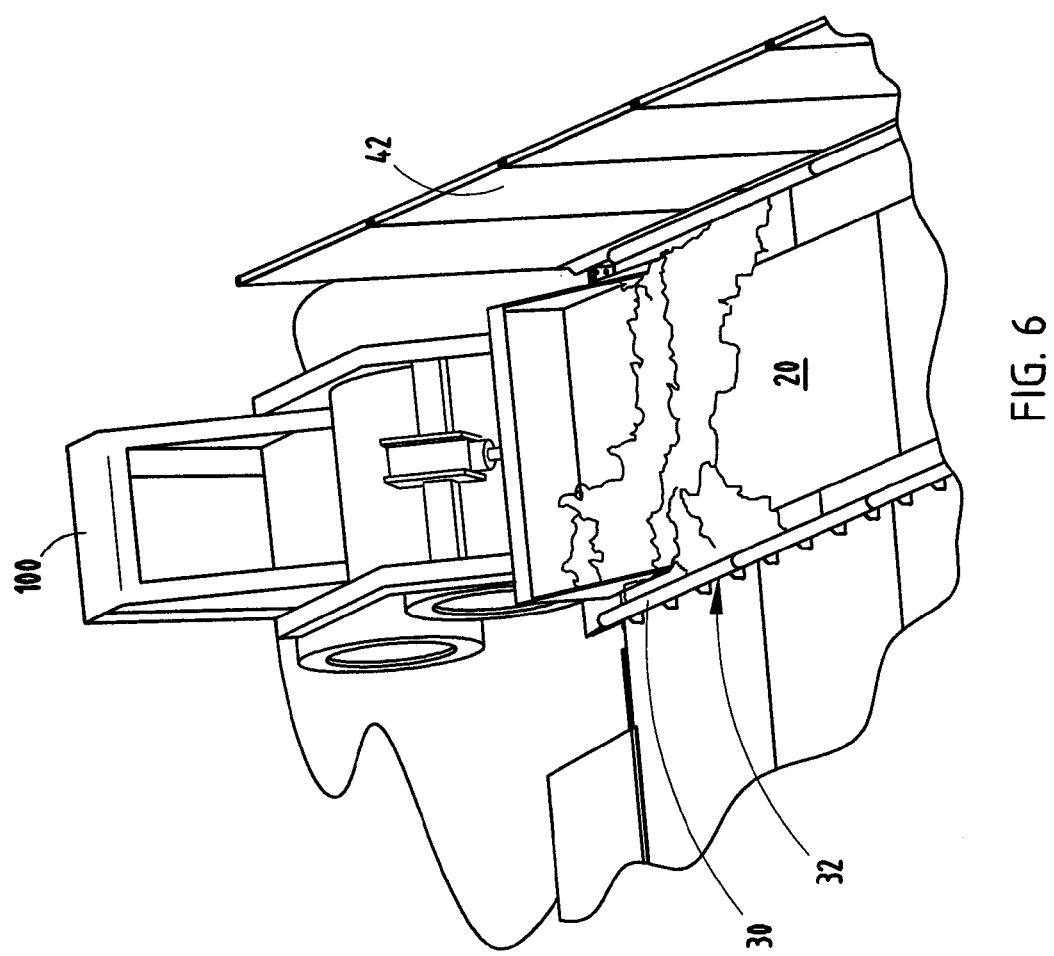
FIG. 6 is an elevational view of the side trough being cleaned out.

Filtering system 24 is then engaged to remove wastewater and small particulate matter from side trough 20. The wastewater and small particulate matter is vacuum-pumped from side trough 20 through tubes 80 to the filtering system 24, where it is filtered. Once the filtering system has effectively cleaned the wastewater, the clean water is then pumped to water tank 60 for reuse. After the liquid and small particulate matter is removed from side trough 20, a vehicle, such as a skid-steer loader 100, is driven into, or at least partially into, side trough 20 to remove the remaining waste (see FIGS. 5-6). More than one object can be cleaned before waste is removed, depending on the amount of waste, and it is contemplated vehicles other than a skid-steer loader may be used to remove the waste from side trough 20.

The present invention results in easy way to clean an object or vehicle, and an easy way to remove waste from the cleaning system after the object is cleaned. The cleaning system of the present invention also allows flexibility of size and shape by using modular pieces and various setups while still using the general, overall concept of the present invention.

We claim:

1. A cleaning system comprising:
a wash floor comprising a deck and being adapted to allow waste to escape the wash floor;
a side trough adjacent the wash floor, the side trough positioned to receive waste from the wash floor, the side trough sized to accommodate a skid-steer loader;
a guide separating the side trough from the wash floor and rail provided at least partly across a length of the cleaning system between the wash floor and the side trough to guide the skid-steer loader when the skid-steer loader is used to clean out the side trough, the guide rail defining at least one opening for allowing solids and liquids to pass from the wash floor into the side trough; and
a filtering system attached to the trough, comprising a pump for pumping liquid from the trough to the filtering system.

2. The cleaning system of claim 1, wherein the wash floor is sloped at an angle other than horizontal to assist in waste escaping the wash floor.

3. The cleaning system of claim 2, wherein the trough comprises one or more fittings for attachment to the filtering system to allow liquid to be pumped from the trough to the filtering system.

4. The cleaning system of claim 3, wherein the wash floor will hold at least 10,000 pounds of weight without permanently deforming.

5. The cleaning system of claim 4, wherein the wash floor is comprised of a plurality of modular wash racks, each modular wash rack adjacent at least one other modular wash rack.

6. The cleaning system of claim 5, wherein each modular wash rack is coupled to at least one other modular wash rack.

7. The cleaning system of claim 6, further comprising a frame and at least one wall extending upwardly from the frame.

8. The cleaning system of claim 1, wherein the wash floor will hold at least 10,000 pounds of weight without permanently deforming.

9. The cleaning system of claim 1, wherein the wash floor is comprised of a plurality of modular wash racks, each modular wash rack adjacent at least one other modular wash rack.

10. The cleaning system of claim 9, wherein each modular wash rack is coupled to at least one other modular wash rack.

11. A cleaning system comprising:
a wash floor;
a side trough adjacent the wash floor being sized to accommodate a vehicle, wherein the side trough includes a guide rail separating the side trough from the wash floor and provided at least partly across a length of the side trough to guide the vehicle when the vehicle is provided therein, the guide rail defining at least one opening for allowing solids and liquids to pass from the wash floor into the side trough, the side trough comprising a drainage fitting; and
a filtering system comprising a tube and a pump, the tube attached to the pump and to the drainage fitting.

12. The cleaning system of claim 11, wherein the wash floor is sloped at an angle other than horizontal to assist in waste escaping the wash floor.

13. The cleaning system of claim 12, wherein the wash floor will hold at least 10,000 pounds of weight without permanently deforming.

14. The cleaning system of claim 13, wherein the wash floor is comprised of a plurality of modular wash racks, each modular wash rack adjacent at least one other modular wash rack.

15. The cleaning system of claim 14, further comprising a frame and at least one wall extending upwardly from the frame.

16. A method of cleaning an object, comprising the steps of:
  (a) providing a cleaning system having a wash floor with a deck that facilitates waste removal from a wash rack; a side trough adjacent the wash floor being sized to accommodate a skid-steer loader and having a guide rail at a side thereof and separating the side trough from the wash floor, the guide rail provided to guide movement of a skid-steer loader therein positioned to receive waste from the wash floor, the guide rail defining at least one opening for allowing solids and liquids to pass from the wash floor into the side trough; and a filtering system attached to the trough having a pump for pumping liquid from the trough to the filtering system;
  (b) placing an object on the wash floor;
  (c) cleaning the object such that water and waste are eschewed into the side trough by way of the deck;
  (d) pumping liquid from the side trough to the filtering system; and
  (e) removing the remaining matter from the side trough using a skid-steer loader.

17. The method of claim 16, wherein the wash floor is sloped at an angle other than horizontal to assist in waste escaping the wash floor.

18. The cleaning system of claim 1, wherein the guide rail is provided at an intersection between the wash floor and the side trough.

* * * * *

UNITED STATES PATENT AND TRADEMARK OFFICE
CERTIFICATE OF CORRECTION

PATENT NO. : 8,506,720 B2  
APPLICATION NO. : 11/761454  
DATED : August 13, 2013  
INVENTOR(S) : Matthew J. Petter et al.

Page 1 of 1

It is certified that error appears in the above-identified patent and that said Letters Patent is hereby corrected as shown below:

In the Claims

Please correct Claim 1 as follows:

At column 4, claim number 1, line number 17, insert the word -- rail -- after the word guide.

At column 4, claim number 1, line number 18, delete the word "rail" after the word and.

Signed and Sealed this  
Fifteenth Day of October, 2013

Teresa Stanek Rea  
*Deputy Director of the United States Patent and Trademark Office*